United States Patent [19]

Nilsson

[11] Patent Number: 4,747,320

[45] Date of Patent: May 31, 1988

[54] SCREW AND NUT DRIVE WITH ROTATION LOCK

[75] Inventor: Sven W. Nilsson, Partille, Sweden

[73] Assignee: SKF Nova AB, Goteborg, Sweden

[21] Appl. No.: 932,796

[22] Filed: Nov. 20, 1986

[30] Foreign Application Priority Data

Dec. 18, 1985 [SE] Sweden .................. 8505997

[51] Int. Cl.⁴ .................. F16H 57/10; F16D 57/10
[52] U.S. Cl. .................. 74/411.5; 74/424.8 R; 187/25; 188/82.2; 188/82.6; 192/8 C
[58] Field of Search .......... 74/411.5, 459, 424.8 R, 74/89.15; 187/25; 188/82.2, 82.6; 192/8 C

[56] References Cited

U.S. PATENT DOCUMENTS

| | | | |
|---|---|---|---|
| 381,492 | 4/1888 | Hallock et al. | 187/25 |
| 2,527,897 | 10/1950 | Todd | 187/25 |
| 3,110,380 | 11/1963 | Meyer et al. | 188/82.6 |
| 3,468,401 | 9/1969 | Letz | 187/25 |
| 3,654,816 | 4/1972 | Beery et al. | 74/424.8 R |
| 3,792,894 | 2/1974 | Vande Water et al. | 187/25 |
| 4,250,762 | 2/1981 | Weatherby | 74/89.15 |
| 4,281,747 | 8/1981 | Knobel et al. | 192/8 C |
| 4,372,432 | 2/1983 | Waine et al. | 192/8 C |
| 4,614,257 | 9/1986 | Harada et al. | 188/82.6 |

Primary Examiner—Lawrence Staab
Attorney, Agent, or Firm—Eugene E. Renz, Jr.

[57] ABSTRACT

In a device for producing self-locking properties of a screw and nut device the nut co-operates with a torque-transmitting part which is rotatable in relation to the nut. Torque is transmitted via a portion on the torque-transmitting part, which portion is arranged in a space between two opposing surfaces on the nut. A helical spring is arranged in a thread around a threaded shaft and has an end portion inserted into the space. The helical portion of the spring has a loose fit in the thread when the nut is driven by the part, whereas the spring is contracted against the shaft when the end portion contacts one of the opposing surfaces of the nut and thereby brakes the rotation if the nut tends to be rotated by an axial load on the nut and the part is disconnected.

1 Claim, 1 Drawing Sheet

SCREW AND NUT DRIVE WITH ROTATION LOCK

FIELD OF THE INVENTION

The present invention relates to improvements in drive mechanisms for linear movement commonly known as screw and nut devices.

BACKGROUND OF THE INVENTION

In drive mechanisms for linear movement comprising screw and nut devices with a low internal friction, the friction may be so low that the screw and nut system is not self-locking, which is a disadvantage in some respects. The low friction, in e.g. a hoisting device, implies that a load hanging in the device will sink as soon as the external hoisting torque on the screw or nut is disengaged, which for security reasons is unacceptable.

The low internal friction, which can be obtained in e.g. so-called ball screw mechanisms, is desirable for energy conservation reasons, however. When such a device is used, in for example a hoisting device, certain rotation locking means must be used. These means usually comprise a brake provided in connection to the drive mechanism, which is thereby comparatively complicated.

The purpose of the present invention is to provide a simple and efficient locking function in connection to the nut in a drive mechanism according to the introduction, so that a screw and nut device becomes self-locking without having a high internal friction which brakes the forward motion of the device.

In accordance with the present invention, a helical spring is provided in the helical thread around the shaft which is of a cross section to complement the thread surface which has end portions inserted into a space 8. By this arrangement torque transmission takes place by squeezing the end portion of the helical spring against one of the surface portions. A wedging action develops between the spring and the shaft when the spring is squeezed radially to increase the contact pressure and thus the braking action.

The existing parts of a screw and nut drive mechanism are efficiently used in such a device, and the complete arrangement can be compact with but few components.

BRIEF DESCRIPTION OF THE DRAWINGS

The following is a detailed description of the invention with reference to the accompanying drawing, in which.

DESCRIPTION OF THE PREFERRED EMBODIMENT

Figure 1:
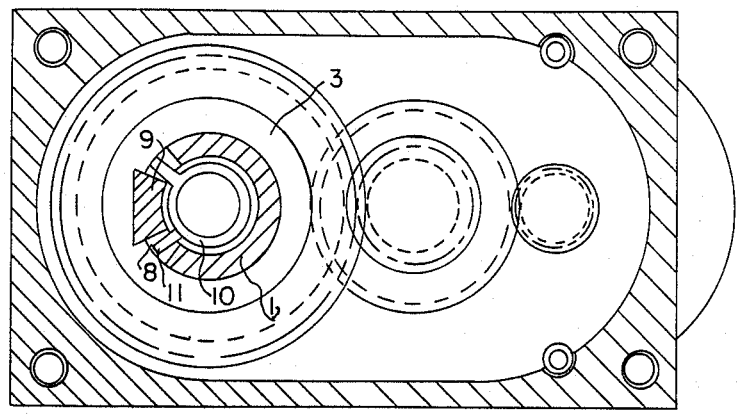
FIG. 1 shows a section according to I—I in FIG. 2.
Figure 2:
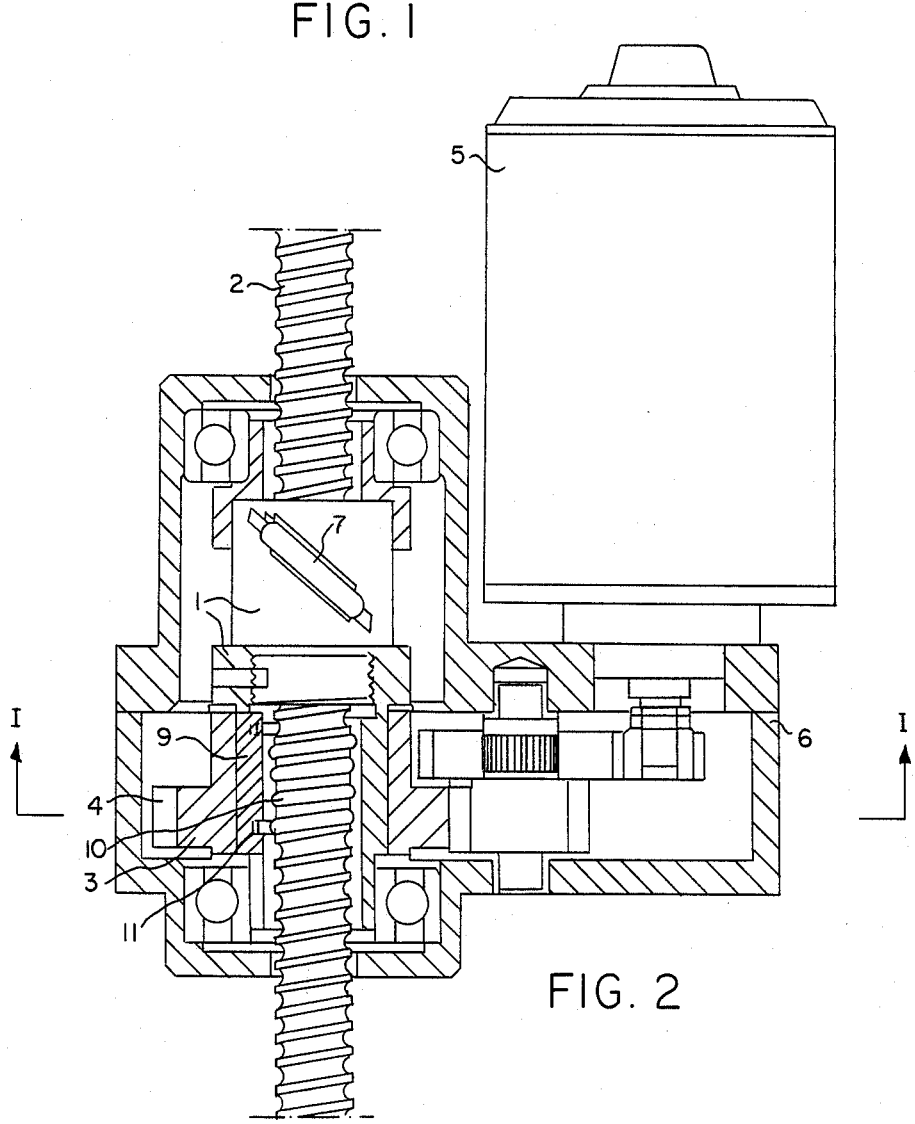
FIG. 2 shows a longitudinal section of a linear drive mechanism with a selflocking equipment according to an embodiment of the invention.

A drive mechanism for linear movement comprises a nut 1 and a threaded shaft 2 which is surrounded by the nut. The nut is connected to a torque transmitting part 3, here shown as a sleeve with a toothed wheel 4 which is part of a gear which transmits torque from a motor 5. The motor 5 is fitted in a housing 6 in which the nut is rotatably mounted, whereby the nut can be rotated by the motor 5 in relation to the shaft 2 so that it is displaced along the shaft together with the housing 6 and the motor 5. The housing 6 can thus be moved linearly by the nut 1 and its drive members, and it can easily be connected to an element which is to perform linear motions. The nut is suitably a so-called ball nut, in which a number of balls circulate in a closed loop which is partly defined by threads in the bore of the nut and threads in the shaft 2 and partly consists of a return conduit 7 radially outside the bore of the nut. Such a device has a low friction, so that, if no measures are taken to brake the rotation of the nut, the housing can be displaced along the shaft 2 by a comparatively small force, which is a disadvantage in case it is desired that the position of the housing is fixed when the nut is not driven by the motor. In order to brake the rotation of the nut when the motor 5 does not exert any torque, the device is so designed that the torque transmission between the part 3 and the nut takes place via a portion 9 of the part 3, which portion has a substantially radial surface acting on an opposing portion of the nut 1, a helical spring 10 being arranged in a thread around the shaft and having an end portion 11 inserted in a space 8 between the portion 9 and the nut 1. In order to make the device operable during rotation in both directions, a portion at the other end of the spring is inserted in a space between a second surface on portion 9 facing away from the first mentioned surface and an opposing surface connected to the nut 1.

When the motor 5 drives the part 3, the portion 9 presses an end portion of the spring 10 against the nut 1, whereby the spring is subjected to a force which is so directed that the helical portion of the spring tends to be expanded. This portion thereby fits looser in the thread than what is the case when the spring is unloaded, whereby the spring can rotate freely in the thread together with the nut which is driven by the motor.

If the part 3 does not take up any external torque, for example if the motor is disengaged, and the housing is subjected to a force, for example the gravitational force which tends to displace the housing along the shaft 2, a component of the force which is transmitted in the thread of the nut 1 will tend to rotate the nut 1. The portion 9 does not transmit any force therewith. An end portion of the spring 10 is thereby pressed by the nut 1 with a force which is so directed that the helical portion of the spring tends to be contracted. Thereby the spring squeezes the shaft and prevents the nut from rotating in relation to the shaft. The device is thus self-locking.

In order to ensure an initial force in the spring, the fit of the spring in the shaft thread is such that a small friction force always occurs when the spring is turned in relation to the shaft. Such a force is necessary for making it possible to exert a force on the end portion of the spring in the initial phase of the squeezing procedure without causing the spring to rotate with the nut. The necessary frictional force is so small that the losses caused by it during the rotation of the device when being driven by the motor 5 are negligible. Because the spring is situated in a groove in the shaft, the groove and/or the spring can be shaped so that a wedging action is developed between the spring and the shaft when the spring is squeezed, which increases the contact pressure and thereby the rotation preventing effect. The groove also determines the position of the spring on the shaft during both free running and braking.

Other embodiments of the invention than those just described are thinkable. For example, a protrusion from the nut 1 may be inserted in a recess in the part 3 together with end portions of the helical spring. The nut need not be a ball nut, and the driving torque does not have to be transmitted by a toothed wheel gear.

What is claimed is:

1. A device for braking relative rotation of a nut (1) and a shaft (2) having a helical thread surrounded by the nut in a drive mechanism for linear movements, characterized in that the nut is connected to a torque transmitting part (3) which is rotatable in relation to the nut, the nut and the part (3) having opposing surface portions extending mainly radially perpendicular to the direction of rotation and delimiting a space (8), a helical spring (10) having a plurality of axially spaced torques engaging in the helical thread around the shaft, the spring being of a cross section to complement the thread surface and whereby a wedging action is developed between the spring and shaft when the spring is squeezed radially to increase contact pressure and thus the braking action, said spring having an end portion (11) inserted into the space (8), torque transmission taking place by squeezing the end portion of the helical spring against one of said surface portions by the other of said surface portions, a portion (9) of the torque transmitting part (3) is arranged between two opposing surface portions in connection to the nut (1), whereby a space is formed between the portion (9) and each one of said surface portions, a portion of the spring at each of its ends being inserted in each space, respectively.

* * * * *